(12) United States Patent
Shahbazi et al.

(10) Patent No.: US 8,068,986 B1
(45) Date of Patent: Nov. 29, 2011

(54) METHODS AND APPARATUS RELATED TO SENSOR SIGNAL SNIFFING AND/OR ANALYSIS

(76) Inventors: Majid Shahbazi, Oakton, VA (US);
Mahmood Shahbazi, Fairfax, VA (US)

( * ) Notice: Subject to any disclaimer, the term of this patent is extended or adjusted under 35 U.S.C. 154(b) by 584 days.

(21) Appl. No.: 12/110,971

(22) Filed: Apr. 28, 2008

Related U.S. Application Data

(60) Provisional application No. 60/914,691, filed on Apr. 27, 2007, provisional application No. 61/064,861, filed on Mar. 31, 2008.

(51) Int. Cl.
*G01V 1/28* (2006.01)
(52) U.S. Cl. ............................... 702/14; 342/28; 726/23
(58) Field of Classification Search .................. 702/14; 342/28; 370/392, 516, 536; 375/368; 382/100, 382/103, 181; 386/83; 701/213; 709/206, 709/224, 225; 710/100; 726/23; 348/126, 348/143, 154, 726
See application file for complete search history.

(56) References Cited

U.S. PATENT DOCUMENTS

| | | | |
|---|---|---|---|
| 4,379,308 A | 4/1983 | Kosmowski et al. | |
| 5,548,731 A | 8/1996 | Chang et al. | |
| 5,689,442 A | 11/1997 | Swanson et al. | |
| 5,805,602 A * | 9/1998 | Cloutier et al. | 370/516 |
| 6,044,401 A | 3/2000 | Harvey | |
| 6,069,655 A | 5/2000 | Seeley et al. | |
| 6,097,429 A | 8/2000 | Seeley et al. | |
| 6,128,649 A | 10/2000 | Smith et al. | |
| 6,301,545 B1 * | 10/2001 | Brodie | 701/213 |
| 6,414,726 B1 | 7/2002 | Chauvel | |
| 6,654,047 B2 | 11/2003 | Iizaka | |
| 7,003,795 B2 | 2/2006 | Allen | |
| 7,149,230 B2 | 12/2006 | Coffin, III et al. | |
| 7,158,598 B2 | 1/2007 | Schetelig et al. | |
| 7,492,306 B2 * | 2/2009 | Humphrey et al. | 342/28 |
| 7,703,138 B2 * | 4/2010 | Desai et al. | 726/23 |
| 7,738,704 B2 * | 6/2010 | Lienhart et al. | 382/181 |
| 2001/0052129 A1 | 12/2001 | Mehra | |
| 2002/0032740 A1 | 3/2002 | Stern et al. | |
| 2003/0198223 A1 | 10/2003 | Mack et al. | |
| 2004/0117478 A1 | 6/2004 | Triulzi et al. | |
| 2006/0062550 A1 | 3/2006 | Lee | |
| 2008/0063237 A1 | 3/2008 | Rubenstein | |
| 2008/0069397 A1 | 3/2008 | Bartsch | |
| 2008/0072264 A1 | 3/2008 | Crayford | |
| 2008/0074496 A1 | 3/2008 | Venetianer et al. | |

OTHER PUBLICATIONS

A.N. Rajagopalan et al. "Detection of People in Images," Neural Networks, vol. 4, Jul. 10-16, 1999, pp. 2747-2752.
Wei Niu et al. "Human Activity Detection and Recognition for Video Surveillance," IEEE Int'l. Conf. on Multimedia and Expo (ICME), 2004, pp. 719-722.
Jeffrey E. Boyd et al. "Statistical Tracking in Video Traffic Surveillance," Computer Vision, The Proceedings of the Seventh IEEE Int'l. Conf. on vol. 1, 1999, pp. 163-168.
Jakub Segen et al. "A Camera-Based System for Tracking People in Real Time," Pattern Recognition, Proceedings of the 13th Int'l. Conf., vol. 3, Aug. 25-29, 1996, pp. 63-67.

* cited by examiner

*Primary Examiner* — John H Le

(57) ABSTRACT

The disclosure relates to Sensor security and Business Intelligence and more particularly to detecting and capturing Sensor information of data in a network environment and extracting information from this un-structured data. Sensors can correspond to video cameras, microphones, access control readers, and various other kinds of sensors in physical security or surveillance systems. In embodiments, data packets having only security sensor data are obtained and reconstructed into their original sensor data stream or data formats. Frames may then be analyzed for points of interest and to derive statistical data. In embodiments, blind spot detection in a video stream using boundary detection and overlay is also disclosed.

28 Claims, 8 Drawing Sheets

METHODS AND APPARATUS RELATED TO SENSOR SIGNAL SNIFFING AND/OR ANALYSIS

CROSS REFERENCE TO RELATED APPLICATIONS

This application claims the benefit of U.S. Provisional Application Ser. No. 60/914,691, filed Apr. 27, 2007, entitled "System to provide Video, Audio and Security Sensor Analytics, situational awareness by displaying Metrics and Optimizations based on Real-time and archived video, audio and other security sensors and security cameras (CCTV)" and the benefit of U.S. Provisional Application Ser. No. 61/064,861, filed Mar. 31, 2008, entitled "Video-Audio Security and Sniffing," both of which are incorporated herein by reference in their entireties.

BACKGROUND

Embodiments relate generally to sensor signal processing, and in particular, to detecting and intercepting sensor signals and/or related data transmitted within a network environment, and/or analyzing the sensor signals to provide, for example, business intelligence.

A network sniffer can be configured to process multimedia data streams within, for example, a public network. They can also be configured to identify packets of incoming data at a station for the reception of digital television signals. However, many network sniffers are incompatible with different software and data protocols currently in the market. This is difficult to maintain since the technology constantly changes and the addition of new, updated proprietary protocols and software are developed. Accordingly, methods and apparatuses are needed to address the shortfalls of present technology and to provide other new and innovative features.

SUMMARY

Embodiments relate to Sensor security and Business Intelligence and more particularly to detecting and capturing Sensor information or data in a network environment and extracting information from this unstructured data.

DETAILED DESCRIPTION

Figure 1:
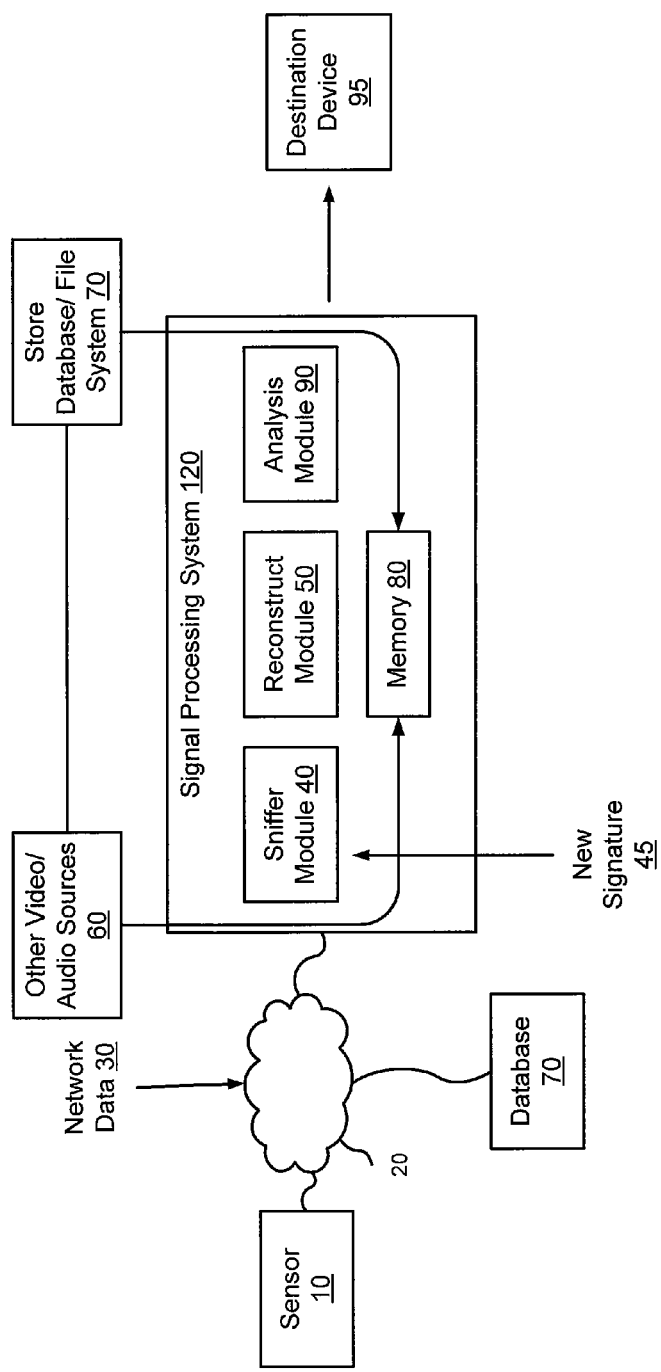
FIG. 1 is a diagram representing the sniffing and security surveillance system.

The systems described herein are configured to process data from, for example, a sensor to provide actionable intelligence which helps in situational awareness and detecting operational vulnerabilities to maintain operational continuity. The systems and methods can be configured to detect, verify and capture sensor signals (e.g., sensor data streams). The systems and methods can also be configured to monitor data traveled over a network (requested by one or many requester(s) from one or many source(s)) and then reconstruct the sensor signals to be used for further analyses.

A computer network environment typically includes multiple nodes in which a node itself can also be, for example, a network (e.g., wide area network (WAN)), an individual workstation, and/or a multi-media capture device (e.g., audio capture device, video capture device). Information can be transmitted between nodes via, for example, Internet Protocol (IP) packets. A network environment can be internal or external to the node and can be, for example, within a local area network (LAN), a WAN, a metropolitan area network (MAN), an Internet, an Intranet, and/or an Extranet.

When referring to Sensor data, it encompasses different types of data from Sensors. The Sensors could be video cameras, Audio microphones, RFID tags, Access Control readers, Fire Alarm system data or any other kind of physical sensors in physical security or surveillance systems that can send data as packets in a computer or other types of network.

The security or surveillance system, in some embodiments, is a physical system in which the sensors pick up physical aspects in the environment such as video, sound, presence, temperature, smoke, etc. and the sensors convert those environmental quantities to electronic data.

In some embodiments, the data streams or series of packets can consist of audio, video or any other type of digital data. The security or surveillance system includes sensors that can be connected to a computer network originally and presently used for other types of computer data such as business data having word processing files, etc. Typically the sensor data of a security system can be sent to a user, viewer or computer as a file or streaming over dedicated transmission lines. When the same security sensors are connected to an existing computer network used for other data (e.g., business data), then the files or stream get processed and broken up into packets at a node on the network to be received by any other node on the network. Thus, packets pertaining to the original complete sensor file compete with other packets on the network containing parts of word processing or spreadsheet files. Therefore, it becomes necessary for a user, viewer or computer of security sensor data to detect which packets are sensor data, capture and separate them from the other packets, reassemble the detected and captured packet into the original complete security sensor files and optionally store the files and analyze the data in sensor files or streams.

A user or process on the network can receive these data streams either in archived or live stream form using the appropriate software.

In order to capture Sensor data streams, a system can be configured to be compatible with different software and data protocols currently in the market.

In some embodiments, the system can be configured to detect and discover different types of information from video and audio, this information can be locating event driven information, like object left behind or scenes motion activity to analyze traffic and patterns or detecting objectionable scenes like nude scenes, etc. This analysis can be done in real-time or based on archived information. Every time a parameter is changed, the Sensor can be configured to review for new analyses. In some embodiments, the analyses are done once and different charts can be obtained from different activities and point of interests.

The other issue is to convert this audio/video stream to meaningful charts and graphs, keeping in mind that there are multiple sources where the Sensor is generated, where some of these products do not employ common standards or are using outdated technology and hence are not compatible with one another.

In some embodiments, the system can be configured to provide ability so that this live Sensor feed and also charts created by the solution of the embodiment can be shared based on customer requests.

In some embodiments, each camera has a field of view. A collection of these cameras that are viewing a certain area have collectively a combined field of view. It is possible that the collection of cameras is not covering complete area of interest. It is important to find these uncovered areas or blind spots automatically and also protect these uncovered areas with a more ridged set of criteria. The blind spot is the camera vulnerability is in essence camera system vulnerability.

A network sniffer (also can be referred to as a signal processing system or system) is a system and method that can monitor network activity when resolving network problems or improving network efficiency. Although the network sniffer can typically access information regarding all data being transferred into the node, the network sniffer does not have any knowledge about the type of data transferred over the network.

The Sensor sniffer can be configured to focus on extracting the video and audio information and analyzing this information using a common platform to enjoy compatibility across many existing video surveillance or video feeds injected into computer networks used for other purposes to provide meaningful information.

The system can be configured to include a sensor sniffer that monitors network traffic and/or detects sensor signal, The system can be configured to verify and/or classify these packets. The system can be configured to capture the packets and rebuild (e.g., reconstruct) the original sensor signal feed in real-time (e.g., on the fly) or as needed.

The system can be configured to decode different streams of sensor signals (e.g., video, audio, codec's, etc.) through the use of network data packet. If it does meet the predetermined criteria, then the data is saved in a database.

The system can be configured to rebuild and reconstruct the original stream or file from the decoded packets identified as a sensor signal (video, audio, etc.).

The system can be configured to analyze the stream or file to provide mostly numerical data, statistical data or indexes regarding a variety of attributes about the stream or file for storage or presentation. Also, the statistical data or indexes can be combined to provide further or different statistical data or indexes. This group of statistical data or indexes is the business intelligence of the present invention.

In some embodiments, the system can be configured to conduct blind spot analysis on the camera's video field of view. In some embodiments, the system can be configured to provide content filtering on the stream or file. In some embodiments, the system can be configured to provide an ability to share the index data, stream or file to other businesses.

In some embodiments, the system can be related to the field of Sensor signals (e.g., audio, video, RFID, Access Control, Fire, infrared, electric frequency, wireless, etc.) and more particularly in capturing Sensor over network and analysis of Sensor information.

In some embodiments, the system can be configured to identify Sensor (Video, Audio, etc.) data packets and the identification of packets of incoming data and later analyzing this useful information.

In some embodiments, the system can be configured to identify and locate available Sensor Signals (for example, video and audio) information streams in a network (internet and Intranet) by decoding network packets and extracting Sensor information traveling over the network and rebuilding the media stream to its original form.

FIG. 1 is a schematic diagram that illustrates the flow of information from a sensor 10 through a signal processing system 120. First video or audio data from cameras, microphones, temperature sensors, motion detectors and any other sensors 10 are transmitted over an existing network 20 (e.g., tcp/ip network). In some embodiments, the network 20 can be any other type of computer or any network having groups of data already carrying other network data 30. The audio/video sniffer 40 can be configured to decode, verify and/or keep selected packets that carry the video, audio or sensor data based on comparisons signature data 45. Reconstruct module 50 can be configured to reconstruct and rebuild the sensor packet data into their original streams and/or files. The resulting files can be stored in database 70 for later use. Then memory 80 (e.g., temporary computer memory) can be configured to store the files and/or streams from database 70 or other video/audio sources 60 or direct (real time) from the reconstruct module 50 for processing by the analysis module 90. The analysis module 90 accomplishes one or more portions of the analysis mentioned above including content filtering, and creation of statistical or index data and then presents the different data to the requestor (destination device 95) based on the requestor's request at the time, and can store the index or statistical data as a collection or archive of business intelligence in a storage device.

Sensor Signal (Video/Audio) Sniffer 40

In some embodiments, the system can be configured to include a node where a signal from the sensor 10 is requested (destination device 95) and a location where signals from the sensor 10 (Source (not shown)) is available. This stream could be based on live streaming and/or archived Sensor information. In some embodiments one or more portions of the signal processing system 120 can be disposed between the source and the destination device 95 either close to the destination device 95 (for example, close to network gateway at destination location) or close to the source (for example, close to network carrier or at source network gateway) or in the middle (for example, at a service provider between the source and the destination device 95). The signal processing system 120 can be configured to intercept one or more packets itself or using a third party tool and sniffs the packets. It is possible that, if sensor 10 is not available (maybe was available at one point of time and not available now due to timeout, issue, etc.) is automatically or manually re-established to make it available again. The signal processing system 120 can be configured, in some embodiments, to continuously check for available connectivity and index of embodiment and if a signal is lost for an extended or predefined time will restart connection source automatically by the solution of embodiment or by the user manually.

Figure 2:
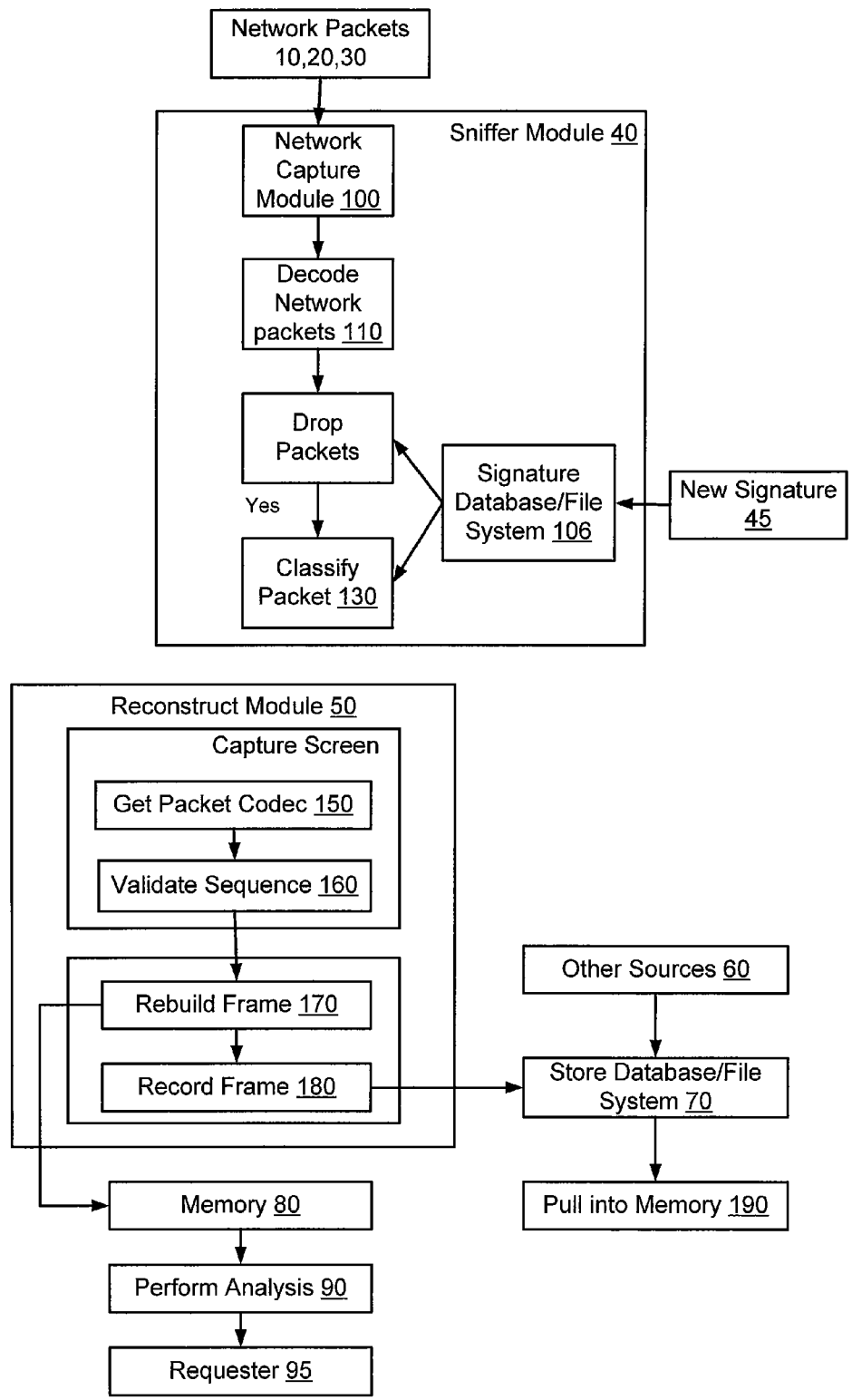
FIG. 2 is a functional block diagram of a Sniffer module and a reconstruct module.
Figure 3:
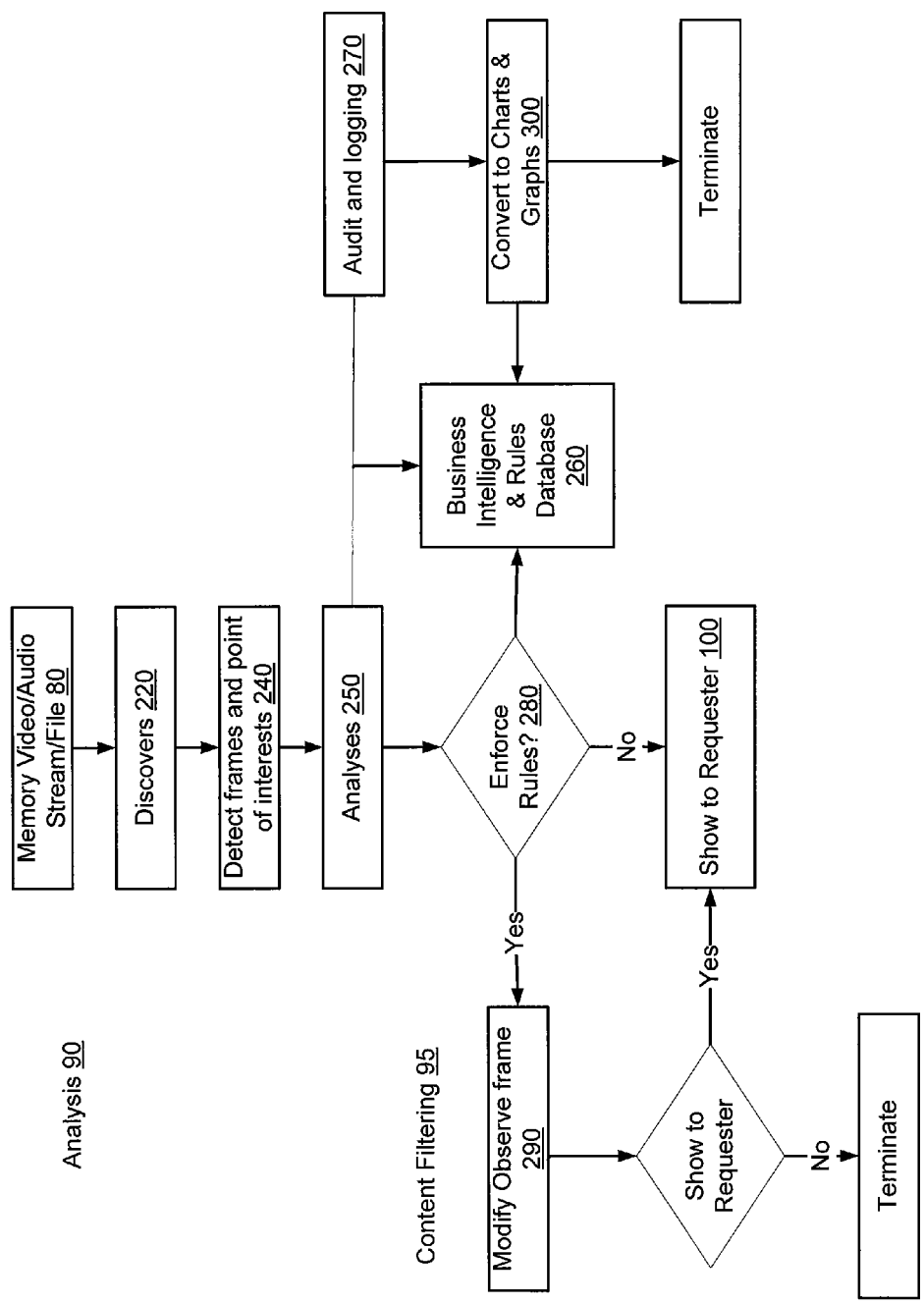
FIG. 3 is a functional block diagram of a method for analysis and content filtering.
Figure 4:
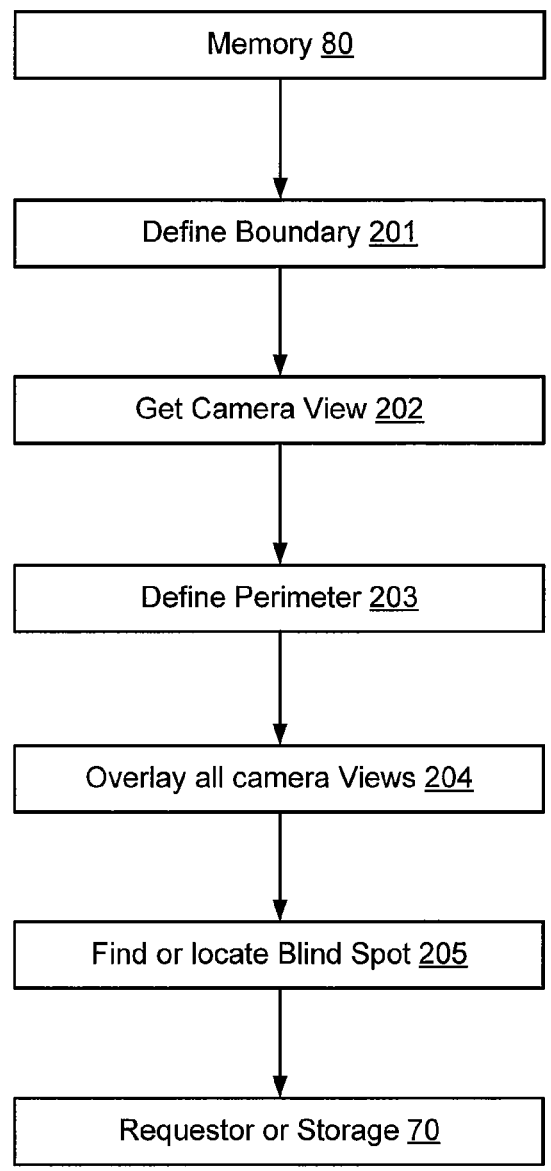
FIG. 4 is a functional block diagram of the blindspot detection feature.

The Sensor sniffer includes at least one of the following processes as shown in FIG. 2, including decode network packets 110, verify 120, classify packet 130, get packet codec 150, and rebuild frame 170. After the video/images are reconstructed and available, the solution of the embodiment includes at least one of the following processes as shown in FIG. 3, discovers 220, detects frames and point of interests 240, analyses 250, audit and logging 270 and converts 300. The above process can happen in different order.

The solution of the embodiment Sensor Sniffer and Sensor analysis solution shown in FIG. 1 could be software and/or hardware solution or a combination thereof. As a software solution it includes decoders, verifier, classifier, collector and reconstructor modules, and as Hardware modules, it includes the same modules embedded in a hardware chip. The choice of hardware/software or a combination thereof is based on choice, requirement, speed, high availability, optimization and bandwidth, etc., Starting with FIG. 2, the network capture module 100 can be configured to capture (e.g., obtain, get) one or more of the network packets from any network (for example, computer network, TCP/IP network, electric network, mesh network, etc.), to provide them for the decode network packets 110. The network capture module 100 can be any dedicated and/or general purpose processing device that can be configured to detect such packet data off the known or ordinary network and is configured to cooperate with the particular type of computer network being used or connected to.

Decode Module 110

The Decode network packets 110 includes adapters to decode the captured Sensor traffic flowing on the network from module 100. This can be done based on input information stored in signature database information. The signature database/file system 106 can be stored on hard-disk or memory and can be updated from a central location or locally 45 as new signatures are available. A signature can be a combination of bytes, information and characteristic which can be unique for each Sensor signal and collected from signal header or codec (in case of media signal) or similar in other Sensor signals. The signature database/file system 106 preferably includes a memory and a database (the signature can be stored on real-time on the physical memory RAM or stored on hard drive database). The decode module 110 can be configured to access/sniff the network traffic and detect Sensor traffic based on different Sensor data structure and meta-data. These data structures and meta-data in signature database/file system 106 are developed based on experiments by reviewing and examining uniqueness of each signal and knowledge of how Sensor data formats are packaged, stored or transmitted. This knowledge and experimentation can then be used to relate to or suggest how the Sensor data formats would be dispersed or broken up amongst the data packets of a computer network or the computer network of interest. The data results in different Sensor data structures and meta-data that are stored in signature database/file system 106. The examination of these signatures can be based on what is unique for (e.g., specific to) each packet and that constitutes the signature for each packet.

An entity using the security system of the embodiment or supported API vendors could update the new signature 45 based on provided API in real-time or as needed with a new and more effective signature, capture and detection technologies, knowledge of new Sensor data formats, new knowledge of new ways, such new or old Sensor data formats are dispersed or broken up amongst the data packets of a computer network or the computer network of interest. Network of interest, refers to the fact that different or new computer networks may collect, break up or disperse data from the sensors in different manners because the different or new networks may use different size packets or different ordering of the bytes or bits within the packet.

The network capture module 100 can be configured to capture each network packet regardless of its source whether data packets are from one of the sensors of the security system or from spreadsheet, word processing, or database files used for other purposes in the business. In some embodiments, the network capture module 100 can be configured to capture specific packets. Then the captured packets are decoded by the decode network 110, by verifying 120 them to the packet signatures from the signature database/file system 106. If the packet does not match the packet signature or does not verify the signature, it is not of interest for the sniffer 40 (according to thresholds set by, for example, an administrator and/or user), and the packet is dropped from Sensor analyses but not dropped from network packet. If the packet(s) is dropped, then the process is continued again with the decode network packets 110. If the packet(s) is of interest, then the above captured and detected packets are output to the verify packet module (not shown)

The Verify module verifies to ensure that the captured and detected packets are matched to the signature stored in the signature database/file system 106. After the Verify process, the packet is transferred to Classify packet 130

The Classify packet 130 classifies the type of captured, detected and/or verified packets and ensures that this packet stream and codec is identified based on header and packet information and the rest of the incoming packets are from the same packet classification. For example, in a higher level classification, the system of the embodiment could conclude this is a Video, Audio or RFID packet and its sub-classification indicates, it is a MPEG-4 codec. The Classification types are stored in and recalled from signature database/file system 106 for matching in order to carry out the classifying process. In some respects, the classify packet 130 can be considered as the hierarchical step in identifying the data in the captured and detected packets or media stream. At the classify packet 130, the Packet header is retrieved from the stream and the packet type is identified. Then the Packet structure is determined and a classification is assigned and it then is stored in signature database/file system 106 and the Packet is kept and classified. The verify and classify process may be optional.

The get packet codec 150 can be configured to receive the packets from classify packet 130 and starts collecting and arranging them into a stream. It is possible that these packets are streamed using different formats and proprietary codec's and hence, it is important this stream is collected, and compiled into a file having the proper format and having the data arranged in the proper order within the file format. At reconstruct mode 50, for example, the packets are collected and the frame sequences are validated with validate sequence 160. The validate sequence 160 maybe optional. In general, validated packets are either stored in a file, memory or database depending on the Sensor signal format and rebuild the packets in it is original format so it would be replayed and archived. This could include packet header information as needed.

The rebuild frame 170 is responsible for final rebuilding the Sensor signal into the original file or codec format that the sensor was originally trying to send on the network before decomposing them into network compatible packets. It is important that captured packet or frames are reconstructed in the same order, so the same Sensor signal is restored. This will rebuild the stream and make it available for analysis using the original file format. The rebuild can be performed as the stream flowing in real time or stored as a file and further rebuilding performed at a later time at the record frame 180. In other words, the content from a sensor signal stream (e.g., a stream of packets) can be stripped from the sensor signal stream and reconstructed into a new file. The new file that includes the reconstructed content can have a form that is substantially similar to the form of the content before the content was sent over a network. For example, an audio video interleave (AVI) movie (original AVI movie) that is parsed and sent over a network in multiple packets can be stripped from the multiple packets and reconstructed into a new AVI movie file that is substantially similar to the original AVI movie.

Indexing System of the Embodiment

The Indexing system of the embodiment is used to provide comprehensive and accurate (at a desirable level) analyses tools in order to provide Business Intelligence (BI) using charts and graphs. The indexing system operates often on the original file format or in real time on the fully reconstructed stream. For example, the indexing system can be configured to operate on the reconstructed stream shortly after the file is reconstructed from the original (which is sent over a network). In other words, the indexing of the reconstructed stream can occur at substantially the same time that the original file is being transmitted over a network to a destination endpoint. In some embodiments, the indexing can be performed while the original file is being reconstructed (before reconstruction of the entire original file is completed). These are some of the attributes (analyses and video indicators) which are part of the index system of the instant invention for handling different aspects of Video and Audio. Some of these attributes are:

- Motion of objects in the Sensor Signal, duration, frequency, amount, size of motions and speed of the objects. The motion extraction is performed using standard Sensor signal formats (e.g., protocols).
- Blobs in the Sensor (including video or audio signals) signal. Blobs are collection of pixel within an area.
- Objects—Objects include small objects, big objects, object classification; car, people, plane, animal, bicycle, etc. and also counting these objects. For example: person, car or tree, etc. in the video, the voice, music, beat, tempo, conversation or speech, to text in the audio.
- Face recognition—Movement, identification of person, how many people in the room. A determination if some or all people are walking, standing, talking
- Tracking objects—As objects are moved within the scene the path of their location is tracked.
- Time frame of Sensor objects—This includes date and time, time zone, etc.
- Colors—Amount, number of colors, hue saturation in one or more objects.
- Textual Information or the recognition of like, signs or license plates in the video and what they say (e.g., optical character recognition (OCR)).
- False Alarms—False in motion and video detection for example, detect water waves and leafs moving. Not enough motion to provide statistics. Noise being misrecognized as real event.
- Density of index or length of time of the above attributes.
- Durability and quality of index. For example whether video frame for the motion attribute has a threshold level of activity (e.g., a substantial level of activity, very little activity). How much area or bytes in the frame would be affected by the motion.
- Traffic of sound or video or temperature in a fire.
- Density or length time of sound or video or temperature in a fire.
- Server Location—where is the server on the network and if the network elements are mapped to physical locations.
- Resolution of the video or audio. How much data per second was captured by the camera or microphone. How close is that rate equal to real time.
- Camera View—How is the view of camera and field of view.
- Depth—What is the depth of view.
- Real-time and historical weather—The current and historical weather report has influence on the view of the camera, for example rain, fog, etc.

All Indexes or attributes or sub-attributes or combination of the attributes described above can be applied for analysis to one or more frames (e.g., all captured frames), either to the whole frame or part of the sensor frame.

The Index or statistics above can be used to produce an overall average of the different indicators. In some embodiments, some attributes can be given more relative importance than others. This Index is a rating which is different for each camera, image, server for that specific environment and view. This index can be used as a performance-tuning metric. For example, the performance-tuning metric can be used to modify an analysis (e.g., used to perform analysis in a desirable fashion).

The above descriptions are only some of the attributes of the Index of the embodiment. The attributes can be classified under many categories subcategories and combinations, so index of different attributes and index of different categories can be collected.

Multi-Dimensional Indexing System of the Embodiment

The Indexing system can be a multi-dimensional approach that takes many indicators into consideration in order to provide the most accurate information. The same Sensor is analyzed from different points of view that make it multi-dimensional.

Camera Location ID

The Camera Location identifier (ID), is a solution that can physically ID cameras, It can be configured to map cameras to physical locations, so rogue cameras can be detected. This can be a device that can send a signal to the camera or using an image that identifies the camera. All cameras will have an ID and any camera without ID needs to be investigated. This can be used for Asset Management.

Business Intelligence and Situational Awareness Analyses 90

After the Sensor signal is rebuilt, the Sensor signal is available for analyses. These analyses can be done real-time or saved and archived and analyzed at a later time.

The perform analysis module 90 of the present invention can be configured to trigger a discovery 220 (shown in FIG. 3) process by looking at activities or events or changes within the video or audio frame currently or continuously being fed from the sensor frames or files temporarily stored in memory 80. In the detect frames and point of interests 240, points of interest are collected for attributes in the index or statistic. In module 250, analyses appropriate for the attribute in the index is performed on the points of interest from the detect frames and point of interests module 240. In the analyses module 250, data for all different attributes are collected. The results of analyses module 250 can be presented to the requester 95 as requested if enforce rules module 280 has policies to define to whether or not enforce content filtering rules.

For example, suppose the frame or file data from memory 80 contains frames with no motion and frames with lots of motion due to Sensor signal activity, for example, video from before and after people walking into room where the camera is located. The gathering of detect frames and point of interests 240 for the motion attribute would focus on the frames only having motion, except to note and/or count, accumulate or calculate the time periods that the frames having no motion occurred. The audit and logging 270 may collect the sideline numerical data pertaining to the time periods that the frames having no motion occurred. Then a motion analysis in 250 would be carried out on the frames having the motion to find all the various sub-attributes of the motion like speed, area in the frame or room where path of the motion took, the length of the path, etc. That motion analysis becomes numerical statistical data and possible thumbnails or snapshots of video to be stored in business intelligence & rules database 260 or presented to the requester 95 and also logged by the audit and logging 270 in representative data.

The results of analysis module 250 can be stored in business intelligence & rules database 260 for future policy development and business intelligence. The result of analyses data from 250 that stored business intelligence & rules database 260 or presented to requester 95 does not have to be the volumes of large humongous Sensor signal (e.g., video or audio or other sensor) data collected over 24-7 year round periods of time, but rather statistical numerical or index data that indicates what events happened over all periods of time accompanied with representative snapshots or thumbnails of the original sensor data. The data stored in the database could be a text or binary data depending to the amount and type of indexes collected. A sensor frame can be received (for example, a video) that shows no activity, rather than storing a large image file, it is converted to a very small amount of data and then stored in database.

At the same time as the analysis is being processed in module 250, the results or partial results of analyses module 250 are stored in the audit and logging module 270. Later the analysis output 250 and further organized data at audit and logging 270 can be converted to charts and graphs in convert to charts & graphs module 300 to provide further business intelligence data and indexes and then stored as business intelligence in business intelligence & rules database 260. The information, charts and graphs can include information about the most active Sensor (based on overall activity of each sensor or selected areas within in sensor), Why Sensor 2, discounts itself every now and then for few minutes, detect traffic pattern, counting activity for each sensor or selected areas within the sensor.

Policies can be dynamically developed and later used for deriving Business Intelligence.

It is possible that a policy is defined by user or/and administrator to help in their operation. Each policy could be different for each Sensor type, for example, in a camera scene, there are many different policies or point of interests which enables collecting charts and graphs from these point of interests. The indexing system of the embodiment is applied to all frames or at least one or part of the frames (one or more frames).

The solution of the embodiment can be configured to analyze one or more Sensor signals using the index information collected using different components from different angles.
Video or Audio Content Filtering 95

While analysis of the video stream/archive is taking place in analyses module 250 and being output, it is possible recall rules and filters stored in business intelligence & rules database 260 and apply them to the enforce rules module 280 to remove or cover up objectionable content at modify observe frame module 290. This will protect against unacceptable video footage to be transmitted or viewed. This will protect against unacceptable video footage to be transmitted or viewed and it could also provide anti-virus solution for video.
Video Blind Spot Optimizer 200

Each camera has a field of view. A collection of these cameras that are viewing a certain area have collectively a combined field of view. It is possible that the collection of cameras is not covering complete area of interest. It is important to find these uncovered areas or blind spots automatically and also protect these uncovered areas with a more ridged set of criteria. The blind spot is the camera vulnerability and camera system vulnerability.

While finding a Blind Spot, it is important to see what the index result for the same time period is for the Blind Spot event since this makes a difference because, it could mean, it is important or not important.

When viewing multiple video feeds or video files from temporary memory 80, a boundary is defined either manually or automatically at define boundary 201 from the different camera views. The video feeds or files having camera views from one camera or multiple cameras systems are obtained at get camera view 202. Then a perimeter is defined at 203 using the boundaries and different views from different cameras. Then all individual camera views from 200 are overlaid at 204. Then locations of the blind spots can be calculated using the perimeter values and overlaid views at 205. The resulting comparisons determine the blind spot areas at 205.

Together the detected blind spots could be stored along with index or statistical data in the business intelligence store and some of the index value can be used to validate and reduce the blind spot by adding new cameras or suggesting change camera direction, lens, etc.
Shared Chart and Video Shared or live chart and video is ability to share, using for example the business intelligence & rules database 260 in the analysis module 90, business specific charts based and snapshots of video on each business or industry using the present system.

The shared or live data could include specific Indexes or business intelligence collected by the system described herein.

Individual companies/users share one/some/all of their cameras via a Live web site, in a bidding process (like eBay) sell/offer a particular "Live" or "Recorded" camera view. The payments are processed and this can be a revenue sharing model.

In some embodiments, a map of the world/US/State/City/Street can be used, so that, for example, the users can enter a zip code and then look for available cameras in that area where there is an activity of interest (Accident, Fire, meeting, wedding, Oscar Red Carpet, celebrity appearance for an event restaurant, shop, etc.)

In some embodiments, the information can be used for online shopping and real-time shopping experience. The information can be used to select items from grocery store shelves which are visible through live camera feed.

In some embodiments, this is Real-time Live camera/chart feed by user participation. In some embodiments, every user, can select one or many of his cameras to be available for online or offline viewing If a building is located next to a public road and if a robbery happens on a bank on that public road or child is abducted on public road or good event is taking place on that public road, not only that person can sell the camera feed from Live, but also it will become a competitive bidding process because every building owner on that public road wants to enjoy the extra income and what's to sell the video feed.

For a owner with a prime spot in his building, the owner can charge more in the bidding process. It may so happen that, the news and media station and TV channels are all getting Live camera feed from the same building at the same time.

This is a great revenue generating opportunity for people who want to setup a business but can not afford the extra cost of overhead.

Live Camera feeds, can be used to create a real-time or near real-time traffic analyses for the car navigator system.

The LiveServerBox that is purchased by customer, this will transfer the live feed to the Live web site and then customer look at Live web site and not the camera server itself.

Upon media inquires web site will show how many Live Cameras at a particular desired location at that time. So they can approach the local owner, to purchase his camera feed. In some embodiments, a live web site will have a database of available cameras ready for viewing and purchase. In some embodiments, a retail or office location can put any camera feed available online on their web site.

Video Analysis Editor/Policy

The Indexing or analysis can be modified with the ability to process the video or sensor data once and to collect Video or sensor data attributes and use it in future. Using the editor/policy tool, the different policies or points of interest is drawn on the screen by a requestor and different metrics are analyzed in real-time or on the fly for different time periods. The video archive is generally stored for a short time because of it's large storage size needs. Each video file can consume a substantial amount of memory. This is a unique approach which helps in converting the video to data and storing the data in structured statistical data (e.g., indexed data) with much less storage needs.

The Analytics' provides real-time metrics and analyzes of a resilient, scalable, end-to-end security infrastructure for more securely managing your enterprise and streamlining your operations. The Analytics enables virtual real-time first responder collaboration and post-incident analysis, centralized administration of all security policies and analytics to improve ongoing operational efficiencies, enable local and remote communication as well as inter-department collaboration, and help to meet industry mandates. In summary, the solution is a business tool, to effectively help management as well as security guards, to manage and secure their enterprise, with a unique application of statistics and mathematical analysis and view user-friendly and real-time security metrics.

The analysis is done based on multi-dimensional data representation to provide a desirable result. The multi-dimensional sensor analyses can be configured to look at for example video, date, and time, during, object, object size, object classification (people, car, etc.), color, angle, direction, resolution, weather, Quality of Service, etc. to come up with the index. This helps the Index to provide a desirable level of accuracy. The multi-dimensional sensor analyses could interface with other systems and applications for example video analytics, video management, sensor management products and collecting sensor signals and event collection and correlation to enhance the multi-dimensional analysis.

The Analytics solution can be a business continuity and predictive system, consistently probing, evaluating, monitoring vital business resources to ensure services availability. One or more resulting information and matrices can be displayed in charts to render decisions at a desirable speed, accuracy and/or quality.

In some embodiments, the system can include a manual mode and/or an automatic mode. In the manual mode, the user can make a decision based on gathered data. In automatic mode, the Analytics intelligent engine can render a decision based on pre-defined and user-defined thresholds. It means, if something passes this particular number/threshold, then automatically send an alarm. Send an email, turn one or more lights on, start offsite backup, etc.

Event Correlation—By integrating Unified Threat Management, Application Performance and Video Analytics, correlate isolated video events to provide better understanding and control over the video stream.

Other system features can include:

Automated Alerts; Automatically send alerts.

Automated reporting: Automatically send reports

Video Performance Tracking: Track the video performance and store it for historical analysis.

Multi-Segment Analysis—Perform analysis based on different segment or point of interest. The analysis can be performed for the whole frame and segmented based on user policy.

Logical Video Map—This is a map (also can be referred to as an Avocado Map) which shows the density of motion and where is the focus of the activity.

Video Availability Management—This shows the video and camera is available and send alerts when there are issues with the camera or video.

Video Compliance Management—This is related to defining policies and ensuring the polices are met and the system is in compliance with the policies. The policies can be defined by the organization or an independent organization or government organization.

Business Impact Analysis and Crisis management—This will define the management of crisis by creating cases for each issue and automatically analyzing the impact of the cameras when there are issues.

Predictive System—This can predict issues based on camera footage and performed business analyses.

Camera Discovery

This can be performed by scanning different IP address on the network and detecting, if specific IP address is a camera or a pc or printer and based on that information map the cameras on the network. The network having previous data or map on the physical locations of all network devices can then be used to derive a physical map of the cameras. Agent-less discovery technology that finds one or more (e.g., all) video cameras connected to the IP or Video network and even provides information as to the different types of camera such as: if they are MPEG or JPEG etc.

Camera Optimizer or View

The Camera Optimizer's security layers provide protection at every layer. With Optimizer's holistic approach to security, one or more points of attack can be secured. As threats become more sophisticated and more diverse, a comprehensive security strategy rather than an uncoordinated collection of precautions to protect multiple points of vulnerability can be formulated based on the principles described herein. The need to protect an infrastructure, including assets, hardware, data, applications and operation can be met using the principles described herein. The Optimizer can also offer a broad security management solution and service to find and fix vulnerabilities and to keep security defenses up to date.

Figure 5:
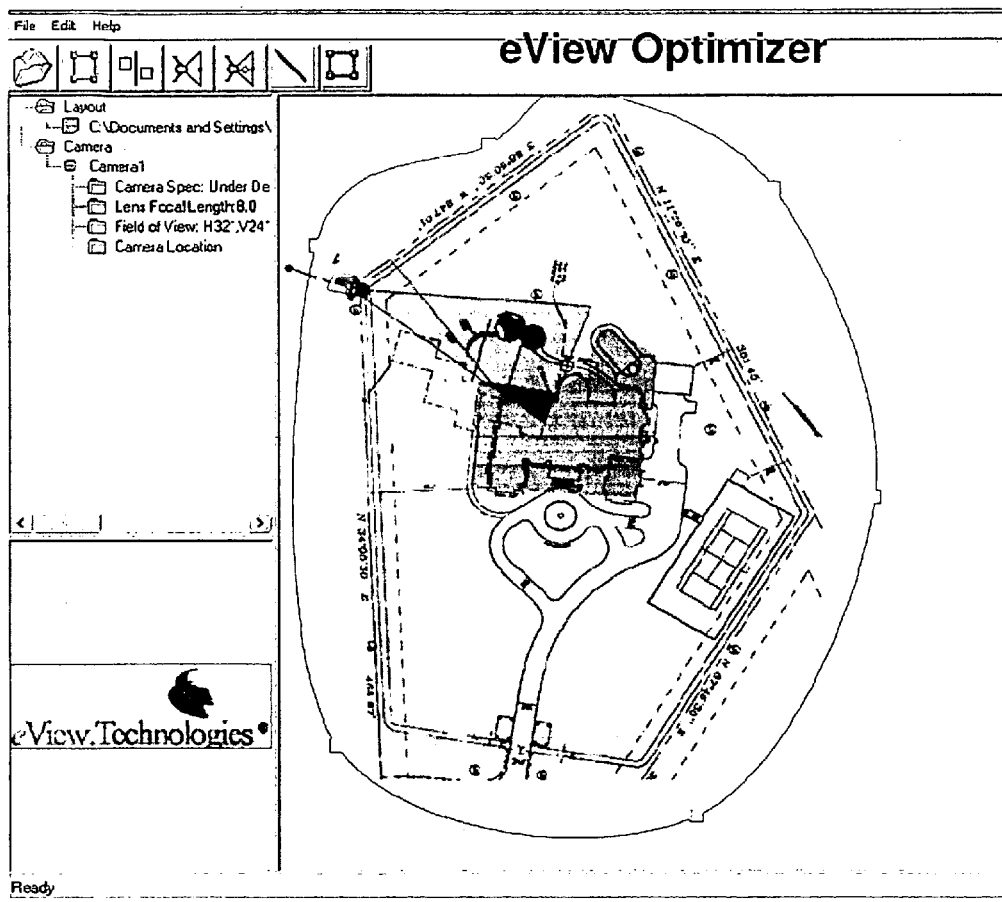
FIG. 5 illustrates an eView Optimizer.

As shown in FIG. 5, the Optimizer (also referred to as an eView Optimizer) allows users to define layers of protection and define a field of view. In some embodiments, the field of view can be automatically calculated and possibly overlaid on a map. It is possible that different types of cameras can be added to the map and their field of view can be defined. The building field of view along with collective camera field of view will help to detect blind spots that are not covered by a camera's field of view. The protection layer is shown in blue and possible field of view in yellow. The camera field of view is shown within each camera. The blind spot is calculated based on yellow area minus sum of all of camera view considering effective camera field of view and considering The Index of e This provides intelligent Optimization of Video/Camera Resources and includes a variety of features. For example, In some embodiments, the system can include a closed circuit television (CCTV) Camera Discovery (IP, Digital, Analog and future other type of camera), Planning Tool to design and verify Camera Locations and area coverage. In some embodiments, the system can include an ability to manually define camera location or automatically place cameras based on predefined condition, computer assessment, Artificial intelligence and more. In some embodiments, the system can include a Video Surveillance Vulnerability Assessment tool which helps in detecting vulnerability. In some embodiments, the system can include a blind spot Finder to locate Blind spots that do not have any camera coverage. This could also include effective camera view coverage. In some embodiments, the system can include a CCTV Process Documentation. This can be used as part of process documentation to provide automated documentation on camera system.

In some embodiments, the system can include a CCTV Bill of Material (BOM) documentation—Define and document the Bill Of Material for the Sensor Project including Cameras, Audio, etc. sensors. This also provides Asset Management on different Camera System. In some embodiments, the system can include a CCTV Historical information (CCTV Birth to implementation)—This developers a Birth Certificate for the system as a reference and documents the changes in the system. In some embodiments, the system can include a CCTV Design and Layout.—This feature provides a design and layout of the system. In some embodiments, the system can include an Intelligent Location Identification & Definition—Automatically Identify and define properties location of the camera system. In some embodiments, the system can include a Individual Camera Style/Type Vulnerability Assessment (Quality of camera, is this the right camera for this spot?)

In some embodiments, the system can include an Individual Camera location Vulnerability Assessment system. In some embodiments, the system can include a Video Surveillance Vulnerability Assessment system (Practical vs Perceived field of view). In some embodiments, the system can include a Physical Security Vulnerability Assessment system. In some embodiments, the system can include a Security Layers Vulnerability and Assessment system. In some embodiments, the system can include a System Delta (For a customer with existing cameras, The solution will calculate actual camera requirements for that site and Delta is the difference between what they need to have and what they already have.)

In some embodiments, the system can include a Matrix/Threat Advisory system (This feature uses information from Delta to identify severability of the threat with respect to the number of existing camera and number of actual required camera). In some embodiments, the system can include an Index and Index system. In some embodiments, the system can include a Shrinkage Index provides size of the location, number of cameras, Cash registry, Number of doors, Number of employees, Number of tables, turn around of staff, and secure physical area.

In some embodiments, the system can include a Perceived Security Threat Level indicator. The fact that in a location for example, Subway restaurant with 800 Sq. ft, we may have 4 cameras to protect the room, customer, cash register may be much less than the number of cameras actually required for that location based upon the calculation from Optimizer. Subway owner, who had previously had an installer to install 4 cameras, may actually need 7 cameras at different spots of the restaurant based on Optimizer Calculations.

Threat Index—Is a matrix of actual index developed based on best practices for any industry. For example; In a fast food restaurant with 1200 Sq. ft., 2 cash registers, 8 employee's, 2 working shift, 2 exists, 12 tables, kitchen area and dinning area with an average sales of $10,000 sales per week, the optimizer will actually suggest 6 cameras. This is a published table that could be used as a reference. For example, for a fast food restaurant with 1400 Sq. ft, the matrix reflects a different number of camera, based on their varied conditions.

In some embodiments, the system can include a Protection Layers Process & Documentation. A Security Protection Layers; Design Process can includes, for example, Layer Identification, Zone requirements (requirement gathering includes points of interests/Field of View definitions, secure door, secure elevator, secure cash register, etc.), Identify sensors locations (add CCTV camera define type of camera; IR, Box, PTZ, motion sensors, pressure sensor, etc.), Assessment (For pre-existing camera at a new customer location, get the Optimizer View of the existing location) and run optimizer to find issues, Draw to define Effective Field of Operation, Automatically detect Blind Spot, Analyses and Optimize, Simulation and Detection=When someone moves around the blind spot, etc., Finalize/Publish security, Historical Site design Documentation, Develop Bill of Material (BOM), Feed real-time information to other systems for early warning assessment, and/or Export plan layout and information.

Figure 6:
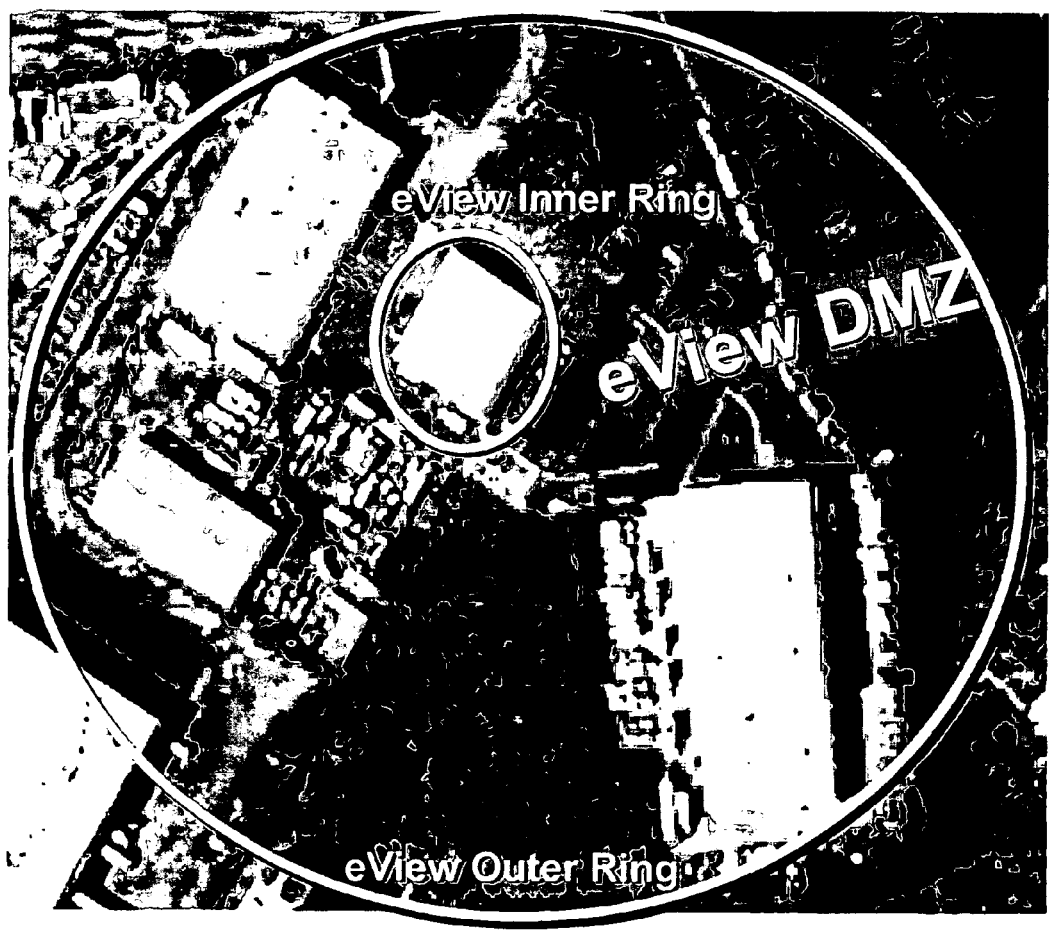
FIG. 6 is a schematic diagram that illustrates protection zones.

As shown in FIG. 6, Protection Layers are defined based on different zones of protection as Inner and outer zones. Everything between Inner and outer Zone can be referred to as a DMZ Zone.

Inner and Outer Security Perimeter Definition/Identification

Desired Camera Locations by Human Input

Desired Camera Locations by XYZ process/user define process

YELLOW AREA=Outer Perimeter/Outer Security Zone/DMZ

BLUE AREA=Inner Perimeter/Inner Security Zone/

Figure 7:
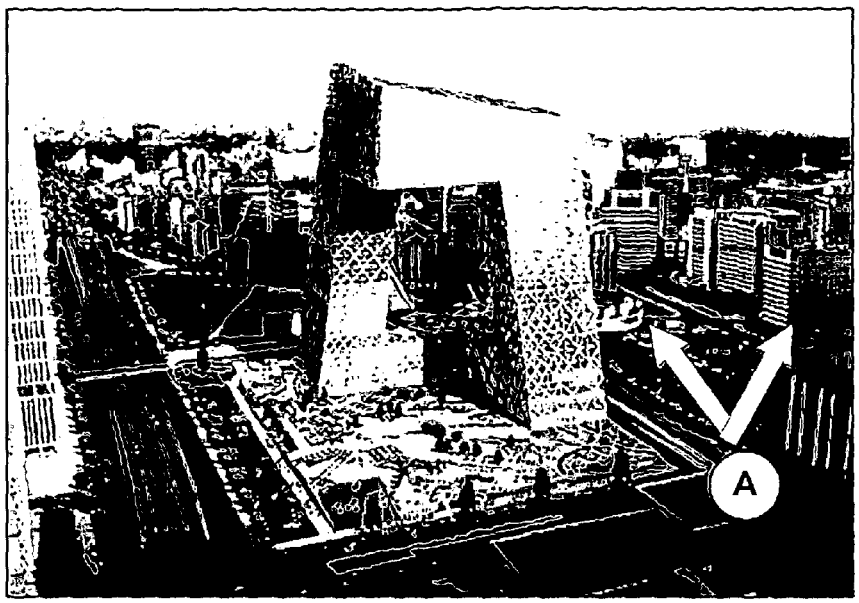
FIG. 7 illustrates an example of point and view.
Figure 7:
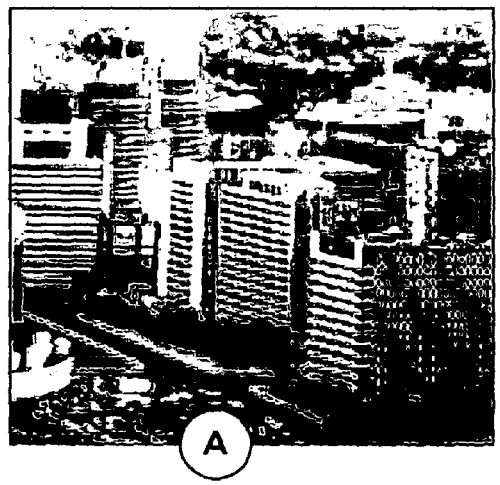

OUTSIDE YELLOW AREA=Outer Perimeter, you can define multiple zones, for example:

1. Physical building to be secured
2. Zone 1
3. Zone 2
4. Inner Perimeter
5. Zone 3
6. Outer Perimeter
7. Outer Zone Video Diagnostic System The system provides a solution that performs diagnostic that works on most to all video and Digital Video Recorder (DVR) systems. The system can include one or more of the following functions: Detect camera focus, Detect power Loss, Detect Camera Shacking, Detect Color analyses, Find ratio of coverage between blind spot, Find movement ratios, A Unique Health Monitoring Service for Video Analyses, Early Warning system to ensure Video System business continuity, etc. These provides diagnostic software and solution, so users will automatically alerted when specific set of actions is taken place 3D Camera View As shown in FIG. 7, the system provides a solution that gets multiple view sources and uses that to provide a 3D view. The system gets video feeds from different cameras and synchronizes it all in one screen. So the user only sees one view and then he moves in the view. Point to an object and then select a view, this will show you a view from the location of point and click. So this way, you can always see different objects from different views and angles and point of views. This requires management of different view in one image and moving around the space to 360 view of the camera and then view everything in different directions. Another idea is to click on the picture and then point of view is changed and now the 360 view is shown from that point.

Avocado Map

The Avocado Map uses one or more of Avocado Index, motion and trends indicators. The map shows the hot zone where there are most activities or Avocado Index. The Avocado map is Sensor Business Intelligence visualization Technique.

Figure 8:
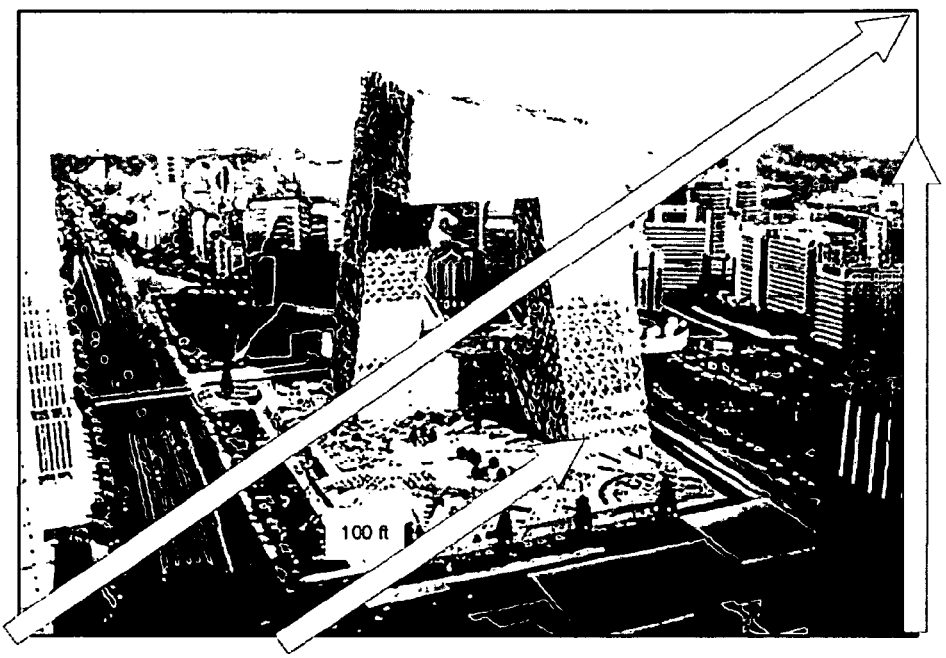
FIG. 8 illustrates a detect motion activity distance and map.

FIG. 8 illustrates a detect motion activity distance and map. Select any video, then using a reference point, calculate the distance and then all your references will be based on that point. All calculations can be done based on that reference point. For example, if an OBJECT is detected (car, face, any item, etc.), the location and areas and how far it is then map based on that can be calculated. When items are detected, they can be mapped based on that where the motion is and where are the activities and create a weather report type of map shows motion activity or object activities.

What is claimed is:

1. A computerized method for sniffing and analyzing only data packets having been identified as coming from a security system sensor in a broader network having other types of devices and providing the decoded packets for file reconstruction, storage and analysis and statistical data comprising the steps of:
   comparing data in the network data packets with a signature data from signature storage related to different types of possible sensor data,
   obtaining resulting data packets having only security sensor data,
   rebuilding and reconstructing captured sensor data into the original sensor data stream or file formats,
   discovering frames within a reconstructed data stream or file that relate to points of interest,
   analyzing the frames to derive statistical data regarding the points of interest in the frames, and presenting the statistical data to a display.

2. The computerized method according to claim 1, wherein the data packets having only security sensor data is verified as being only security sensor data by comparison with signatures from the signature storage.

3. The computerized method according to claim 2, wherein the data packets having been verified are classified as to the types data packets using signature data from the signature store.

4. The computerized method according to claim 1, wherein the analysis step provides snapshots of sensor data corresponding to the statistical data.

5. The computerized method according to claim 4, wherein said presenting the statistical data and sensor data snapshots are provided to a human viewer.

6. The computerized method according to claim 5, wherein said statistical data and snapshots are filtered before being provided by the human requestor by control input from a rules database.

7. The computerized method according to claim 4, wherein said analysis of the statistical data and sensor data snapshots are provided to a business intelligence database.

8. The computerized method according to claim 7, wherein said statistical data and said snapshots are filtered before being provided to the business intelligence database by control input from a rules database.

9. An apparatus for sniffing only data packets having been identified as coming from a security system sensor in a broader data network having other types devices comprising:
   a capture module collects all network data packets,
   a decoding module compares all collected network data packets with signature data input representing different types of sensor data from a signature storage device and outputs only data packets corresponding to sensor data,
   a reconstruct module converts output sensor data packets into original sensor data streams or data files.

10. The apparatus according to claim 9, further comprising a verifying module coupled between the decoding module and the reconstruction module to verify that sensor packet data are not duplicate or lost packets caused by errors on the original network and are accurate sensor packet data.

11. The apparatus according to claim 10, further comprising connecting the signature storage device to the verify module to provide further signatures required to verify the integrity of the sensor data packets.

12. The apparatus according to claim 11, further comprising a classify module connected between the verify module and the reconstruction module and further connected to input from the signature storage to classify the sensor data packets.

13. The apparatus according to claim 12, further comprising a video storage device stores the sensor data files output from the reconstruct module and a memory for temporarily stores the data files to be input to an analysis module.

14. The apparatus according to claim 13, further comprising said analysis module having a discovery module for detecting points of interest from frames of said sensor data files; an analysis application module for analyzing said points of interest in the frame data for statistical data that describes the point of interest in the frame data; and a logger that captures further data from the frame data related but not in the points of interest and a storage device for storing the statistical data.

15. The apparatus according to claim 14, further comprising said analysis application module outputs snapshot video data to accompany the statistical data to said storage device for storing both said statistical data and the snapshot video data.

16. The apparatus according to claim 15 further comprises a sharing module connected to said storage device in said analysis module to share said statistical data and snapshot data with others who do not have said analysis system.

17. The apparatus according to claim 14, further comprising a conversion module for converting data from said logger to charts and graphs which are stored in said storage device.

18. The apparatus according to claim 17, further comprising a filtering module having filtering rules input to filter sensor data from said analysis module.

19. The apparatus according to claim 9, further comprising a video storage device stores the sensor data files output from the reconstruct module and a memory temporarily stores the data files to be input to an analysis module.

20. The apparatus according to claim 19, further comprising said analysis module having a discovery module for detecting points of interest from frames of said sensor data files; an analysis application module for analyzing said points of interest in the frame data for statistical data that describes the point of interest in the frame data; and a logger that captures further data from the frame data related but not in the points of interest and a storage device for storing the statistical data.

21. The apparatus according to claim 20, further comprising said analysis application module outputs snapshot video data to accompany the statistical data to said storage device for storing both said statistical data and the snapshot video data.

22. The apparatus module according to claim 21, further comprising a filtering module having filtering rules input to filter sensor data from said analysis module.

23. The apparatus according to claim 21 further comprises a sharing module connected to said storage device in said analysis module to share said statistical data and snapshot data with others who do not have said analysis system.

24. The apparatus according to claim 20, further comprising a conversion module for converting data from said logger to charts and graphs which are stored in said storage device.

25. An apparatus for blind spot detection in a video stream comprising,
- a temporary memory holding the video stream for a boundary detection module so that it can define boundaries,
- the video stream is also input to a overlay module which overlays the video stream frames on the boundaries output from boundary detection module and a comparison between the boundaries and overlaid video frames is output to show the blind spots that have been detected.

26. The apparatus according to claim 25, further comprising connection to an analysis system of the video stream that outputs statistical data on the events in the video stream.

27. A computerized method for blind spot detection in a video stream comprising the steps of,
- temporarily holding the video stream for a boundary detection module so that it can define boundaries in the frame, and
- overlaying the video stream frames on the boundaries in the frame and outputting the difference between the boundaries and the overlaid video frames to a display to show the blind spot areas that have been detected.

28. The method according to claim 27 wherein blind spot areas detected is provided to a analysis system of the video stream that outputs statistical data on the events in the video stream.

* * * * *